(12) United States Patent
Pollmann et al.

(10) Patent No.: US 11,054,914 B2
(45) Date of Patent: Jul. 6, 2021

(54) PEN/TOUCH TABLET COMPUTER HAVING MULTIPLE OPERATION MODES AND METHOD FOR SWITCHING OPERATION MODES

(71) Applicant: Wacom Co., Ltd., Saitama (JP)

(72) Inventors: Konrad Pollmann, Vancouver, WA (US); Michael Thompson, Vancouver, WA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/773,437

(22) Filed: Jan. 27, 2020

(65) Prior Publication Data

US 2020/0159365 A1 May 21, 2020

Related U.S. Application Data

(63) Continuation of application No. 16/154,262, filed on Oct. 8, 2018, now Pat. No. 10,545,610, which is a
(Continued)

(51) Int. Cl.
*G06F 3/02* (2006.01)
*G06F 1/16* (2006.01)
(Continued)

(52) U.S. Cl.
CPC .......... *G06F 3/0227* (2013.01); *G06F 1/1632* (2013.01); *G06F 3/038* (2013.01);
(Continued)

(58) Field of Classification Search
CPC .... G06F 1/1626; G06F 3/0227; G06F 1/1632; G06F 3/03545; G06F 3/038;
(Continued)

(56) References Cited

U.S. PATENT DOCUMENTS 9,053,250 B2   6/2015   Halim et al.
9,189,428 B2   11/2015  Pollmann et al.
(Continued)

OTHER PUBLICATIONS

Asus, "Asus Transformer AiO P1801, The All-in-One PC that Transforms into a Tablet," downloaded from http://www.asus.com/AllinOne_PCs/ASUS_Transformer_AiO_P1801/ on Aug. 20, 2013, 22 pages.
(Continued)

*Primary Examiner* — Tammara R Peyton
(74) *Attorney, Agent, or Firm* — Seed IP Law Group LLP

(57) ABSTRACT

A tablet computer is provided, which includes a sensor section operable to detect positional input by a human operator and output a positional input signal; a display, laid over the sensor section, operable to receive and display a video signal; and a processor, coupled to a memory storing programs for running an operating system (OS) and executing software loaded to the memory, the processor being operable to receive and process the positional input signal from the sensor section and to output a video signal of the OS and the software to the display. The tablet computer further includes a sensor signal filter capable of selectively communicating the positional input signal from the sensor section to the processor, to a separate external processor, or to neither the processor nor the separate external processor; and a display switch capable of coupling the display to the processor or to the separate external processor.

17 Claims, 10 Drawing Sheets

Related U.S. Application Data continuation of application No. 15/583,522, filed on May 1, 2017, now Pat. No. 10,095,352, which is a continuation of application No. 15/375,753, filed on Dec. 12, 2016, now Pat. No. 9,639,207, which is a continuation of application No. 14/938,293, filed on Nov. 11, 2015, now Pat. No. 9,519,352, which is a continuation of application No. 13/970,587, filed on Aug. 19, 2013, now Pat. No. 9,189,428.

(51) Int. Cl.
| | | |
|---|---|---|
| *G06F 3/0488* | (2013.01) | |
| *G06F 13/00* | (2006.01) | |
| *G06F 3/0354* | (2013.01) | |
| *G06F 3/041* | (2006.01) | |
| *G06F 3/038* | (2013.01) | |
| *G06F 3/14* | (2006.01) | |
| *G06F 13/38* | (2006.01) | |
| *G06F 13/42* | (2006.01) | |
| *G06F 3/044* | (2006.01) | |
| *G06F 13/40* | (2006.01) | |

(52) U.S. Cl.
CPC .......... *G06F 3/03545* (2013.01); *G06F 3/044* (2013.01); *G06F 3/0412* (2013.01); *G06F 3/0416* (2013.01); *G06F 3/0488* (2013.01); *G06F 3/14* (2013.01); *G06F 13/00* (2013.01); *G06F 13/385* (2013.01); *G06F 13/4282* (2013.01); *G06F 13/409* (2013.01); *G06F 2203/04104* (2013.01); *G06F 2203/04106* (2013.01)

(58) Field of Classification Search
CPC ...... G06F 3/0412; G06F 3/0416; G06F 3/044; G06F 3/0488; G06F 3/14; G06F 13/00; G06F 13/385; G06F 13/4282; H04N 21/43637
See application file for complete search history.

(56) References Cited

U.S. PATENT DOCUMENTS

| | | | |
|---|---|---|---|
| 9,519,352 | B2 | 12/2016 | Pollmann et al. |
| 9,639,207 | B2 | 5/2017 | Pollmann et al. |
| 10,095,352 | B2 | 10/2018 | Pollmann et al. |
| 2006/0109252 | A1 | 5/2006 | Kolmykov-Zotov et al. |
| 2012/0054401 | A1 | 3/2012 | Cheng |
| 2012/0094594 | A1* | 4/2012 | Rofougaran .......... G06F 1/1626 455/15 |
| 2013/0093683 | A1 | 4/2013 | Hu et al. |
| 2013/0106760 | A1 | 5/2013 | Pedersen et al. |
| 2013/0207905 | A1 | 8/2013 | Hankins et al. |
| 2013/0219433 | A1 | 8/2013 | Arai |
| 2013/0271395 | A1 | 10/2013 | Tsai et al. |
| 2013/0298081 | A1 | 11/2013 | Chen |
| 2014/0035851 | A1 | 2/2014 | Kim et al. |
| 2014/0043236 | A1 | 2/2014 | Zhang et al. |
| 2014/0092304 | A1* | 4/2014 | Chen ................ H04N 21/43637 348/552 |
| 2014/0307174 | A1 | 10/2014 | Zhu |
| 2014/0307175 | A1 | 10/2014 | Oka |

OTHER PUBLICATIONS

Asus, "The ASUS Innovation Showcase at COMPUTEX 2013," downloaded on http://press.asus.com/events/asus-transformer-book-trio.php on Aug. 20, 2013, 2 pages.

Benjamin, "How to use the new Find My iPhone app," downloaded from http://www.idownloadblog.com/2012/09/20/fin-my-iphone-lost-mode/ on Feb. 13, 2015, 16 pages.

Wacom Store—United States, "Cintiq 24HD Touch Pen Display," downloaded from http://store.wacom.com/us/en/product/DTH2400? on Aug. 21, 2013, 13 pages.

\* cited by examiner

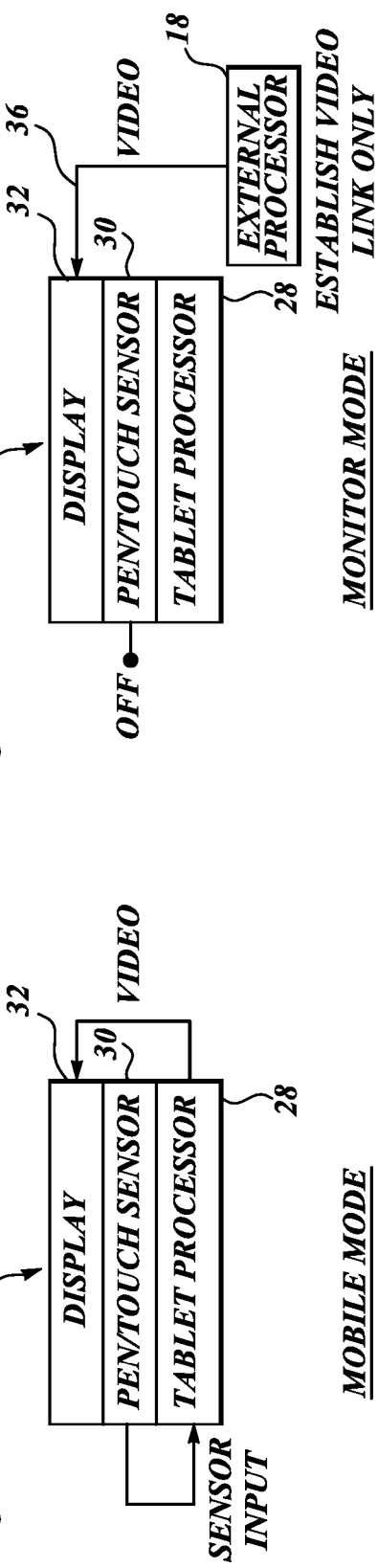
Fig. 2A.
Fig. 2B.
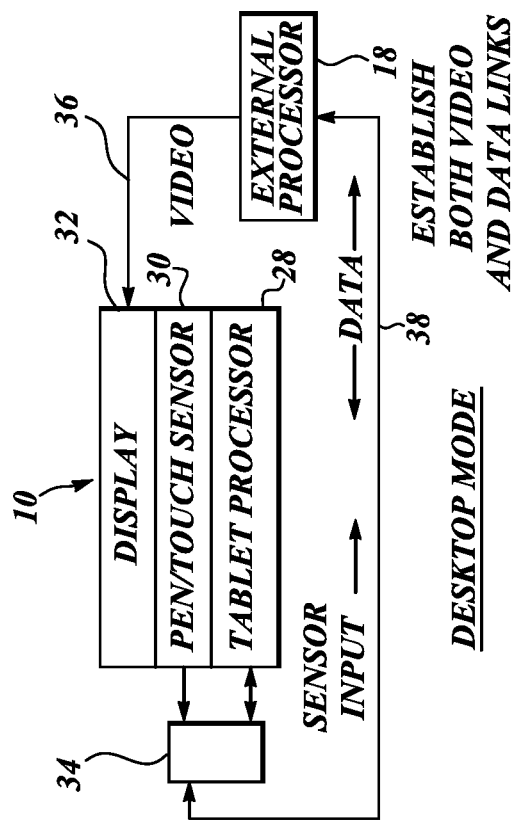
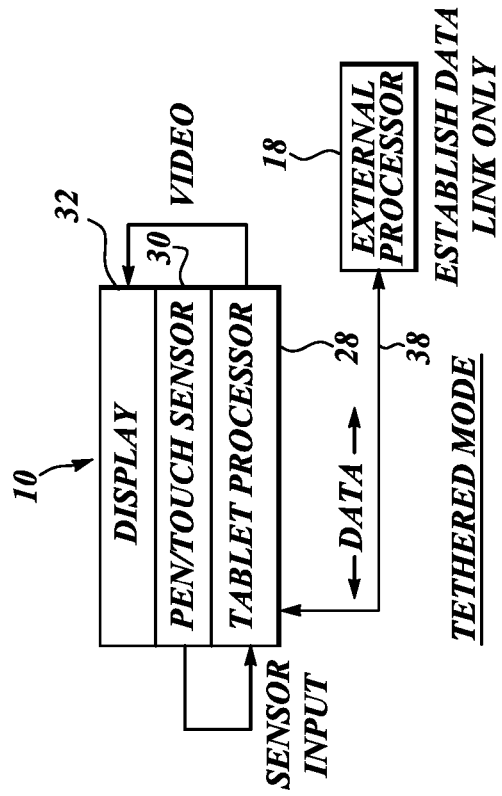
Fig. 2C.
Fig. 2D.

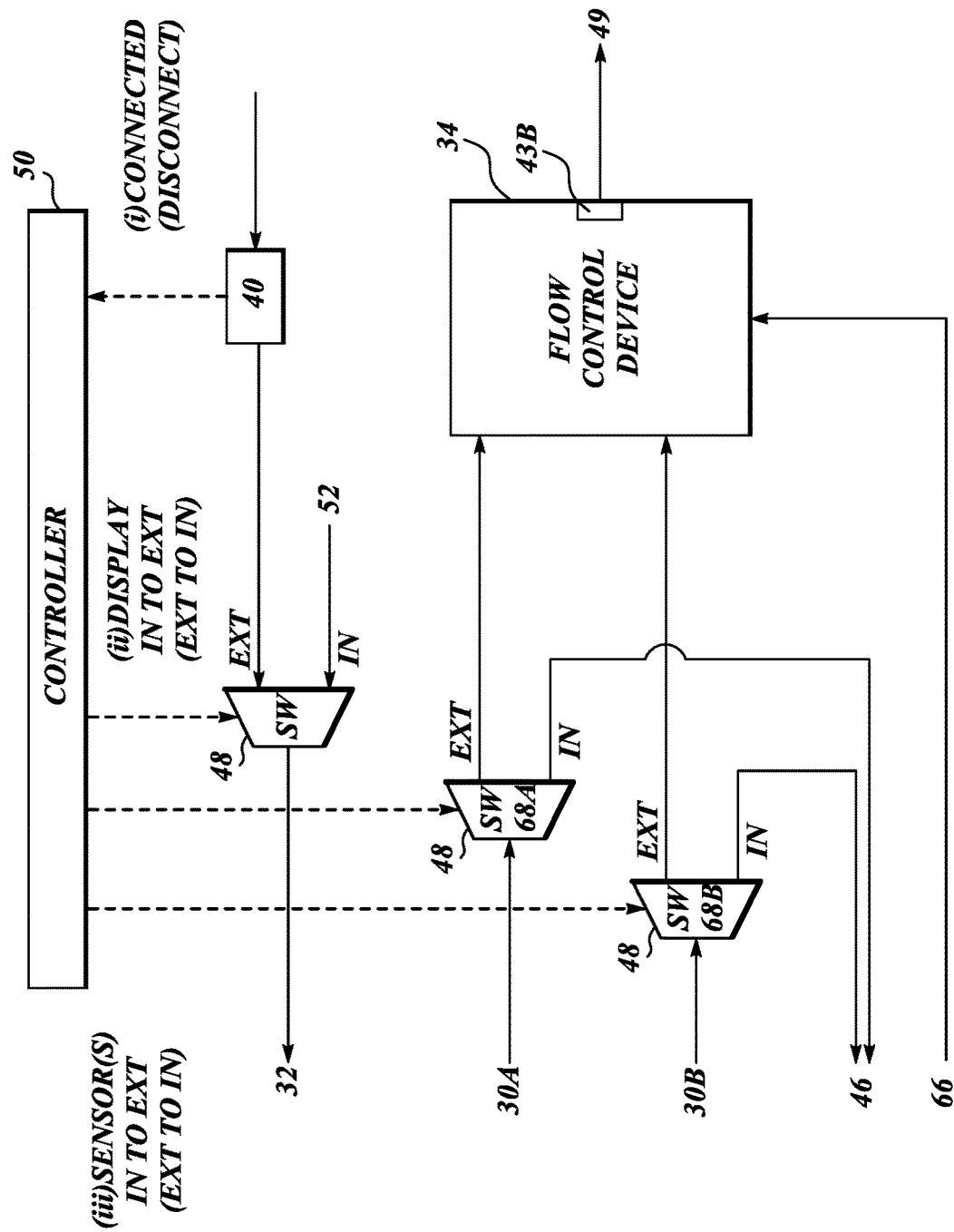

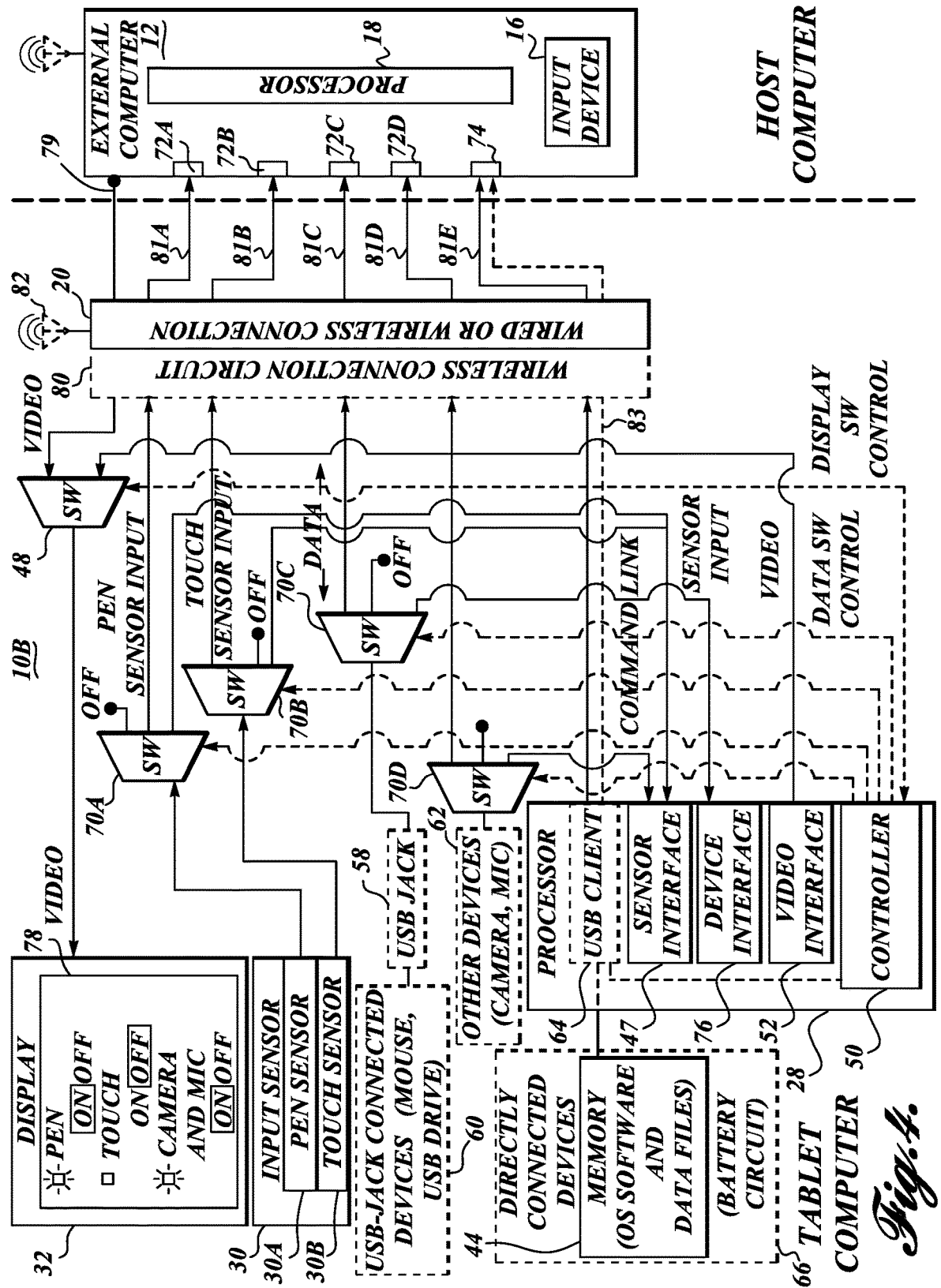

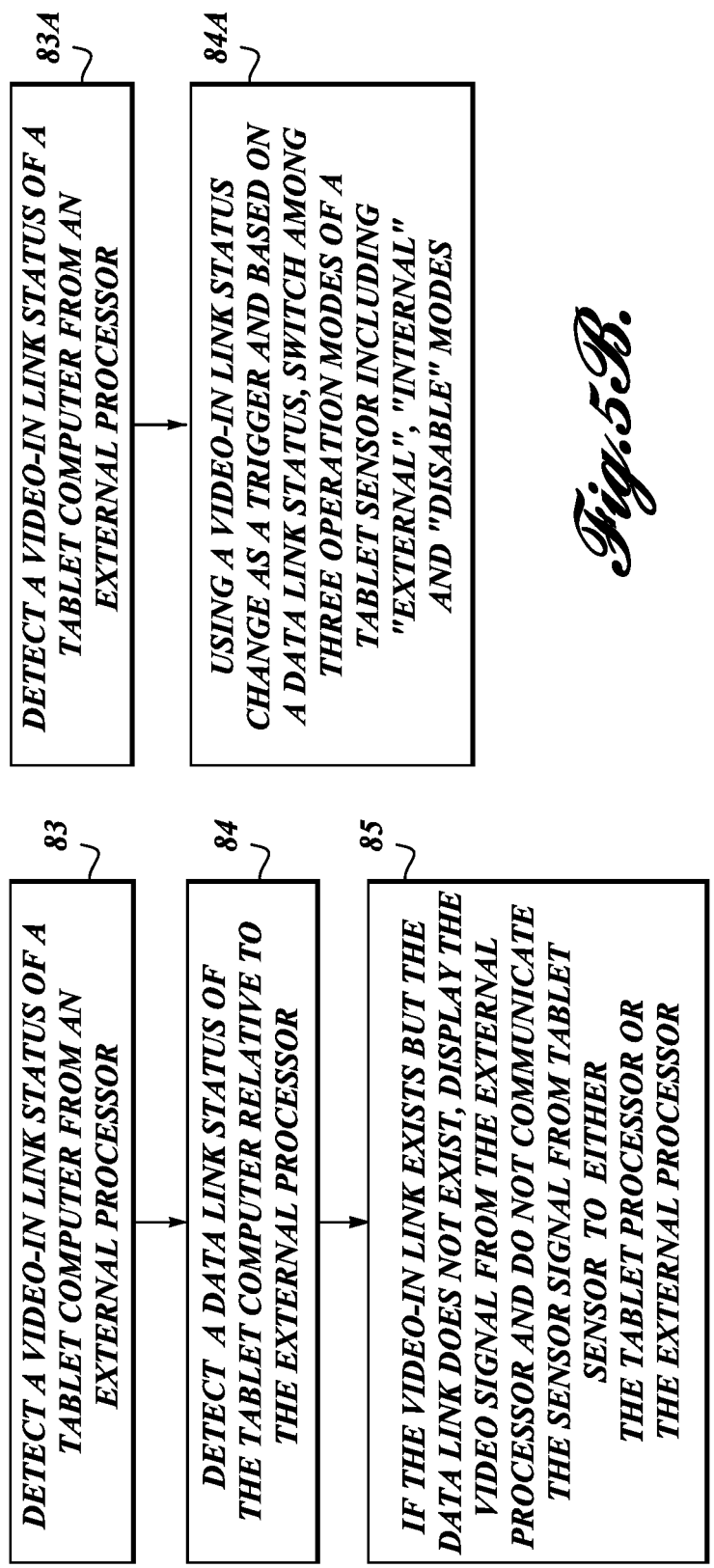

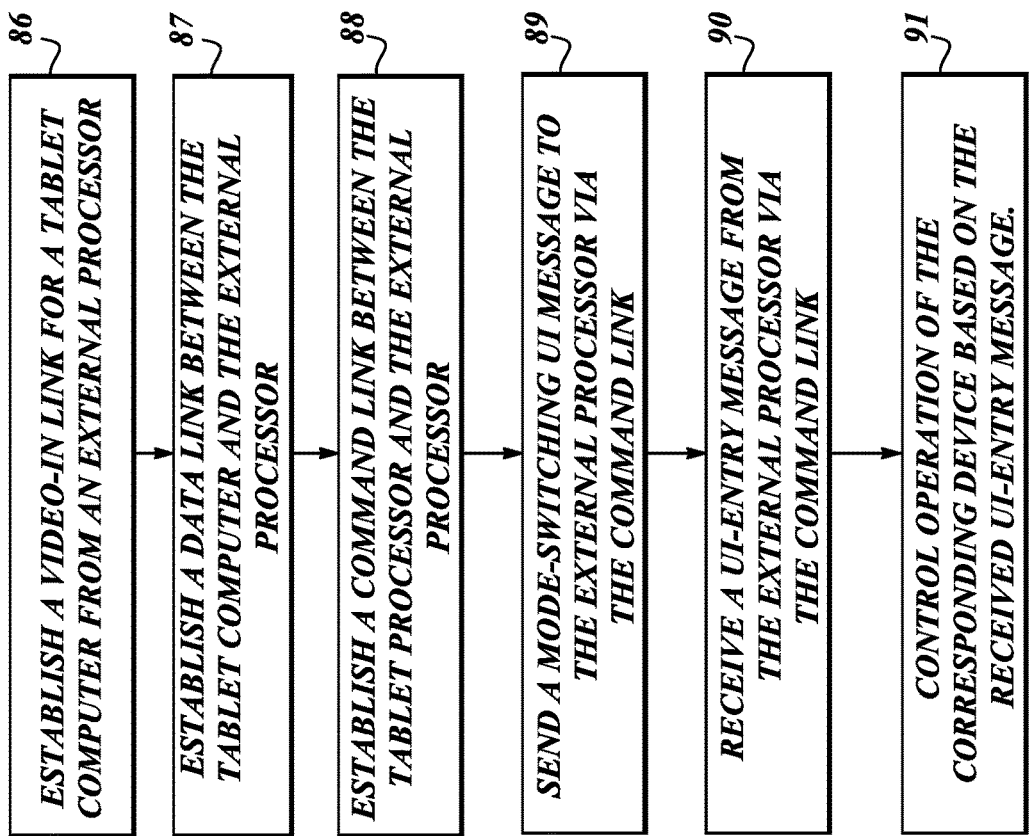

PEN/TOUCH TABLET COMPUTER HAVING MULTIPLE OPERATION MODES AND METHOD FOR SWITCHING OPERATION MODES

BACKGROUND

Technical Field

The present invention relates to a tablet computer capable of being coupled to an external computer, and specifically to such tablet computer capable of switching its operation modes when coupled to an external computer.

Description of the Related Art (1) Graphics Tablet (Digitizer) and Pen Display A graphics tablet or a digitizer is widely used among users who wish to create hand-drawn images and graphics on a computer, similar to the way a person draws images with a pencil and paper. A typical graphics tablet includes a flat surface, upon which the user may "draw" or trace an image using a stylus or a pen-like drawing implement. The image generally does not appear on the tablet itself but, rather, is displayed on the monitor of an external computer, to which the graphics tablet is connected.

Some graphics tablets incorporate an LCD screen into the tablet itself such that the user's hand-drawn images appear on the tablet itself. These devices are called pen displays, one example of which is the Cintiq® line of pen displays available from WACOM®. A pen display allows the user to draw directly on the display surface. A pen display is required to be connected, via a wired or wireless connection, to an external computer having greater computational resources, such as greater processing power of CPU or GPU or memory capacity. A pen display utilizes the processing power of an external computer, and is categorized as a dependent or peripheral device of the external computer.

(2) Mobile Tablet Computer

On the other hand, in a mobile computer world, a mobile tablet computer including a CPU, memory, and a touch/pen sensor with a display has been widely used. A tablet computer, which may run on battery power and whose processor is controlled by its own operating system (OS), is originally designed to be used independently of other computers ("mobile mode"). A user of such tablet computer may utilize a positional input sensor, typically a touch sensor, to interact with the OS and application software to, for example, send emails or surf the web. A tablet computer's processor, in part due to its compact size, is often inadequate for carrying out computationally intensive processing such as graphics data processing.

BRIEF SUMMARY

It is possible to couple a tablet computer to a dedicated external processor so as to utilize the full processing power of the external processor controlled by its own OS different from the tablet computer's OS ("desktop mode").

When a tablet computer is coupled to an external processor, it is desirable to optimize the allocation of computational resources (CPUs, LCD, UI, battery, storage area) between the two computers. To that end, having just desktop mode whenever a tablet computer is coupled to an external processor may be insufficient. A need exists for a tablet computer capable of switching between multiple operation modes when coupled to an external processor.

Typically a tablet computer includes numerous operable devices, such as a positional input sensor (a pen sensor and/or a touch sensor), a display, a storage device (memory), a camera, a microphone, a speaker, etc., and a user may wish to keep one or more of these devices under the control of the tablet computer's own OS, as opposed to having them accessible or controllable by the external processor's OS. In other cases, the user may wish to even disable one or more of these devices altogether, for example, to save battery power of the tablet computer, because a tablet computer typically continues to operate on battery power even after it is coupled to an external processor. Therefore, a need exists for a tablet computer capable of switching operation modes of its devices, such as a pen/touch input sensor, when the tablet computer is coupled to an external processor.

According to one aspect of the invention, a tablet computer is provided, which includes a sensor section operable to detect positional input by a human operator and output a positional input signal; a display, laid over the sensor section, operable to receive and display a video signal; and a processor, coupled to a memory storing programs for running an operating system (OS) and executing software loaded to the memory. The processor is operable to receive and process the positional input signal from the sensor section and to output a video signal of the OS and the software to the display. The tablet computer further includes a sensor signal filter capable of selectively communicating the positional input signal from the sensor section to the tablet computer processor, to a separate external processor, or to neither the tablet computer processor nor the separate external processor. The tablet computer still further includes a display switch capable of coupling the display to the tablet computer processor or to the separate external processor.

The tablet computer according to such configuration is capable of switching operation modes of the position input sensor (e.g., pen/touch sensor) and the display when the tablet computer is coupled to an external processor.

According to a further aspect of the invention, the tablet computer processor controls the sensor signal filter (e.g., a three-way switch) and the display switch (a two-way switch) to automatically switch operation modes of the sensor and the display based on a video-in link status and a data link status of the tablet computer relative to the separate external processor. For example, upon detecting that the video-in link exists but the data link does not exist relative to the separate external processor (i.e., the tablet computer is partially coupled to the external processor via the video-in link only), the tablet computer processor controls the display switch to couple the display to the separate external processor and controls the sensor signal filter to not communicate the positional input signal to either the tablet computer processor or the separate external processor. As a result, the tablet computer functions as a monitor for the external processor, i.e., operates in "monitor mode" according to various embodiments of the present invention.

According to another aspect of the invention, a method of switching operation modes of a tablet computer is provided. The method includes generally three steps: (i) detecting a video-in link status of the tablet computer relative to a separate external processor; (ii) detecting a data link status of the tablet computer relative to the separate external processor; and (iii) when the video-in link exits but the data link does not exist relative to the separate external processor, displaying a video signal from the separate external processor on a tablet display and not communicating the positional input signal from a tablet sensor to either the tablet computer processor or the separate external processor. The last step entails operating the tablet computer in monitor mode.

According to a further aspect of the invention, a tablet computer is provided, which is capable of being coupled to an external computer wirelessly or via a single cable. The tablet computer includes a sensor section operable to detect a positional input by a human operator and output a positional input signal; a display that is laid over the sensor section and is operable to receive and display a video signal; and a processor that is coupled to a memory storing programs for running an operating system (OS) and executing software loaded to the memory and that is operable to receive and process the positional input signal from the sensor section and to output a video signal of the OS and the software to the display. The tablet computer also includes one or more devices coupled to the processor and operable to transfer data with the processor. The processor includes a controller configured to control execution of the following generally six steps: (i) establishing a video-in link for the tablet computer (for the tablet display) from a separate external processor; (ii) establishing a data link between at least one of the sensor section and the one or more devices of the tablet computer and the separate external processor; (iii) establishing a command link with the separate external processor; (iv) sending a mode-switching user interface (UI) message to the separate external processor via the command link to cause the separate external processor to display a mode-switching UI on the tablet display, the mode-switching UI including at least one user-selectable element to control operation of at least one of the sensor section and the one or more devices of the tablet computer; (v) receiving user selection of the at least one user-selectable element on the tablet display, made via an external input device connected to the separate external processor (or via the sensor section, if not disabled), as a UI-entry message from the separate external processor via the command link; and (vi) controlling operation of the corresponding device based on the received UI-entry message.

BRIEF DESCRIPTION OF THE SEVERAL VIEWS OF THE DRAWINGS

FIGS. 3A and 3B are block diagrams each illustrating an example configuration of a tablet computer coupled to an external processor, according to some embodiments of the present invention.

FIG. 3C is a block diagram of an example configuration of a flow control device and a 2-to-1 switch, which allows for various operational modes switching of a tablet sensor.

FIG. 4 is a block diagram of another sample configuration of a tablet computer coupled to an external processor wirelessly or via a single cable, according to other embodiments of the present invention.

FIGS. 5A and 5B are each a flowchart illustrating an example process of switching operation modes of a tablet computer coupled to an external processor.

FIG. 6 is a flowchart illustrating another example process of switching operation modes of a tablet computer coupled to an external processor, suitable for execution in a tablet computer coupled to an external processor wirelessly or via a single cable.

DETAILED DESCRIPTION

Figure 1B:
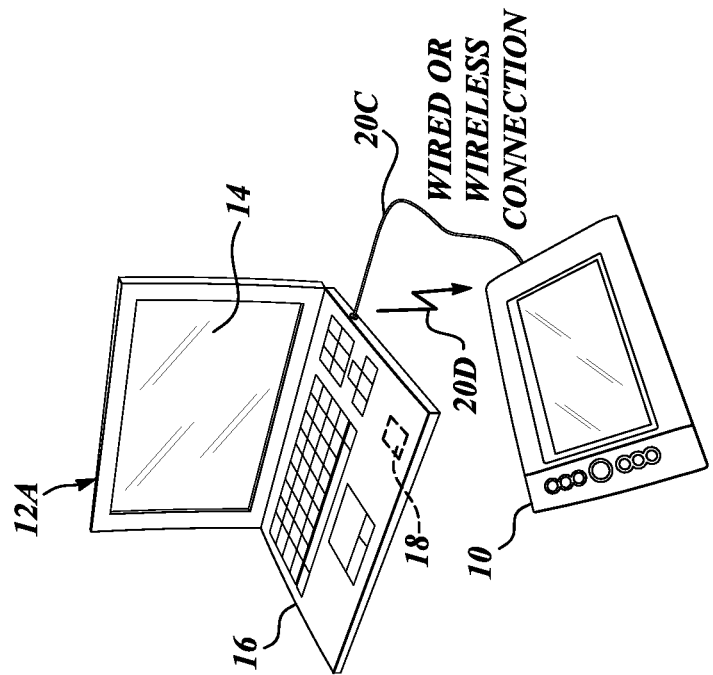
FIGS. 1A and 1B each illustrate an example tablet computer coupled to an external processor.
Figure 1A:
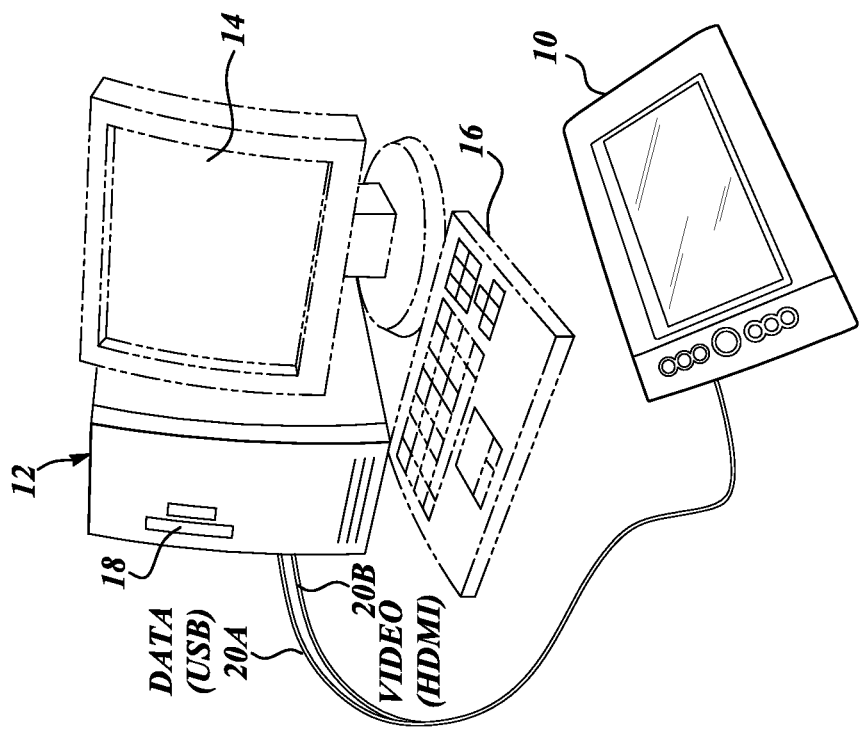

FIGS. 1A and 1B each illustrate an example tablet computer 10 coupled to an external processor 18. As more fully described below, the tablet computer 10 includes a positional input sensor such as a pen sensor, a touch sensor, or a combination of a pen sensor and a touch sensor, which is operable to detect positional input by a human operator and to output a positional input signal. The tablet computer 10 also includes a display, laid over the sensor section, operable to receive and display a video signal. The tablet computer 10 may further include additional (peripheral) devices such as a storage device (memory), a camera, a microphone, a speaker, etc. Though not specifically illustrated, both the tablet computer 10 and the external processor 18 have a power input port, and additionally at least the tablet computer 10 includes a battery to be operable in mobile mode. According to various embodiments of the present invention, when the tablet computer 10 is coupled to the external processor 18, one or more of the operable devices of the tablet computer 10, such as the positional input sensor, may be selectively disabled or left under the control of the tablet computer 10's operating system (OS).

FIG. 1A shows the tablet computer 10 coupled to the external processor (CPU) 18, which is part of a desktop computer 12 including a display 14 (optional) and an input device 16 (optional), such as a keyboard with a touchpad, as shown, and/or a keyboard, a touchpad, a mouse, a trackball, a pen and/or touch input sensor, etc. As used herein, the terms external processor and external computer are used mostly interchangeably, as will be apparent from the context of the description. Those skilled in the art would readily recognize that a processor connecting via standard video or data links to other devices is typically integrated into a computer, although in theory a direct connection is also possible. FIG. 1B shows the tablet computer 10 coupled to the external processor 18 built within a laptop computer 12A, which also includes a built-in display 14 and a built-in input device 16 such as a keyboard with a touchpad, as shown. According to various exemplary embodiments, one advantage of the present invention is that the tablet computer 10 can be coupled to any generic external processor operating on any standard OS, such as a PC operating on Microsoft Windows® OS, and any processor operating on Mac® OS, Linux® OS, and other standard OSs. In order to attain this advantage, the tablet computer 10, not an external processor, is responsible for controlling transitions between various operation mode when coupled to the external processor. Any additional, non-standard software or hardware implementations are not required in the external processor in various embodiments of the present invention.

In some embodiments, as shown in FIG. 1A, the tablet computer 10 is coupled to the external processor 18 via a combination of a data line 20A such as a USB cable, and a video line (or a multimedia line) such as an HDMI (High Definition Multimedia Interface) cable 20B. This is because a generic external processor 18 and computer 12 typically include two physically separate data and video ports, such as, e.g., a USB port and a HDMI port.

In other embodiments, as shown in FIG. 1B, a data line and a video line may be combined into one line to be received at a single physical port provided for the external processor 18 in the notebook computer 12A, in which case a single cable 20C (e.g., Thunderbolt® cable) may be used to couple the tablet computer 10 to the external processor 18. In still further embodiments, a wireless connection 20D (e.g., Bluetooth®, a USB protocol data encapsulated in frame IEEE 802.11a/b/g/n, WiHD (WirelessHD™) or a similar technology) may be used to couple the tablet computer 10 to the external processor 18 and computer 12 to substitute the respective wired technologies.

When the tablet computer 10 is coupled to the external processor 18 and computer 12 via a single cable connection 20C or a wireless connection 20D, through which all of the lines (e.g., the data line, the video line, a command line, etc.) are connected or disconnected at the same time, a user is given the ability to selectively connect or disconnect one or more of these lines to effect operation mode switching for the tablet computer 10, as will be more fully described below in reference to FIG. 4.

In this specification, the word "connected," "coupled," "communicate," or "link" with regards to the input (e.g., pen/touch) sensor signal interface includes at least the following meanings: (1) an electric signal is detected between physical layers of the input sensor and a host processor (the tablet processor or the external processor); (2) a handshake procedure is initiated between the input sensor and a host processor (e.g., a USB handshake between MAC layers of the input sensor and a host processor); (3) a logical pipe is established between the input sensor and a host processor; and (4) an electric signal is detected between physical layers associated with the input sensor and a host processor (e.g., in the case of USB connections, an electric signal being detected between physical layers of the next-hop node of the input sensor in a USB network and a host processor).

In this specification, the word "connected," "coupled," or "link" with regards to the display interface includes at least the following meanings: (1) an electric signal is detected between physical layers of the display and a host processor (the tablet processor or the external processor); (2) an association is established between the display and a host processor; and (3) a display data transfer process is established between the display and a host processor. FIGS. 2A-2D illustrate four different operation modes of the tablet computer 10, including "mobile mode" when the tablet computer 10 is not coupled to an external processor, and three other modes ("monitor mode," "tethered mode," and "desktop mode") when the tablet computer 10 is coupled to the external processor 18 in computer 12/12A.

Figure 2:
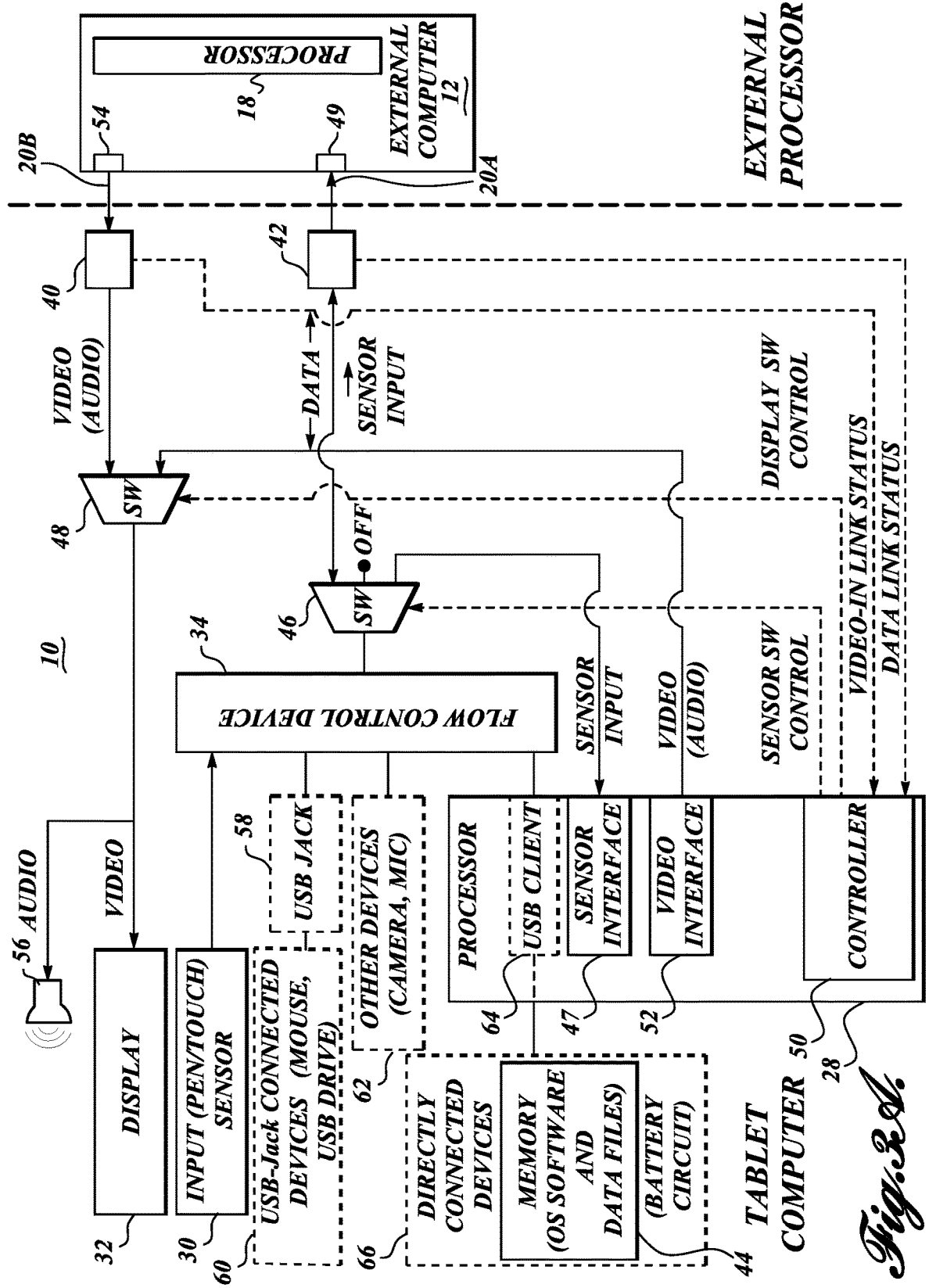
FIGS. 2A-2D illustrate operation modes of a tablet computer coupled to an external processor, including "desktop mode," "tethered mode," and "monitor mode."

FIG. 2A shows the tablet computer 10 in "mobile mode," wherein the tablet computer 10 is not coupled to any external processor. The tablet computer 10 includes a built-in tablet processor 28 running a suitable OS (e.g., Android® OS, iOS®, Windows® Mobile OS, etc.), a positional input sensor 30 such as a pen sensor and/or a touch sensor, and a display 32 laid over the positional input sensor 30.

The position input sensor 30 is operable to detect positional input made by a human operator using a pen and/or a finger, and output a positional input signal indicative of a position pointed to by the operator. A positional input sensor may be a pen sensor configured to detect a position of a pen (stylus) relative to a sensor surface, or a touch sensor configured to detect a position of a finger relative to a sensor surface, or a combination of a pen sensor and a touch sensor. Various pen sensors are known such as those based on electromagnetic coupling between an X-Y matrix of line electrodes arranged on a sensor surface and a resonant circuit provided in a pen. Various touch sensors are known such as a capacitive type sensor configured to detect a finger touch at an intersection between an X electrode and a Y electrode in an X-Y sensor matrix as a change in capacitance between the X and Y electrodes.

The display 32 is laid over the positional input sensor 30 and is operable to receive and display a video signal. As used herein, a video signal includes a video signal and an image signal, digital or analog (e.g., Low-voltage differential signaling (LVDS), Display Port (DP), Internal DisplayPort (iDP), Digital Visual Interface (DVI), analog RGB signals, or similar), and may be part of a multimedia signal including both video and audio signals (e.g., HDMI or WirelessHD, or similar signals). In some cases, it is possible to use different types of signals. For example, a video-out link may be in compliance with a first signal type (e.g., LVDS) while a video-in link may be in compliance with a second signal type (e.g., HDMI). In these cases, a translator is included that is configured to convert one of the video signal types to the other type. The translator may then include a video signal sensor 40, to be described below, which detects an incoming video signal from the external processor 18 and sends a video-in link status signal at a proper timing pursuant to the relevant video signal type.

The display 32 may be an LCD (Liquid Crystal Display), organic EL (Electro Luminescence) display, or any other suitable display or screen that can be used with the positional input sensor 30.

The relative positions of the tablet processor 28, the positional input sensor 30, and the display 32 are not limited to what is illustrated and, for example, the positional input sensor 30 made of substantially transparent material may be placed on top of the display 32 if a user can view the display 32 through the positional input sensor 30.

In mobile mode as shown in FIG. 2A, the positional input signal from the sensor 30 is sent to the tablet processor 28, and the tablet processor 28 sends a video signal to the display 32. The tablet processor 28 is coupled to a memory storing programs for running a tablet OS (e.g., Android® OS, iOS®) and executing any software loaded to the memory. The tablet processor 28 receives the positional input signal for the tablet OS and the software and outputs a video signal of the tablet OS and the software to the display 32.

FIG. 2B shows the tablet computer 10 in "monitor mode," wherein a video-in link 36 is established for the display 32 to receive a video signal from the external processor 18, but the positional input signal from the sensor 30 is not sent to either the tablet processor 28 or the external processor 18. As a result, the positional input signal of the sensor 30 is ignored and, hence, the tablet computer 10 essentially functions as a monitor display for the external processor 18, which may or may not include its own display 14 (see FIGS. 1A and 1B). Monitor mode of operating the tablet computer 10 coupled to the external processor, in which the position input sensor 30 is essentially disabled, is one aspect of the present invention as will be more fully described below.

FIG. 2C shows the tablet computer 10 in "tethered mode," wherein the display 32 receives a video signal from the tablet processor 28 and the positional input signal from the sensor 30 is sent to the tablet processor 28, similar to mobile mode, but a data link (e.g., a USB link) 38 is established between the tablet processor 28 and the external processor 18 such that data can be exchanged between the two processors (as well as between the memories of the two computers 10 and 12).

FIG. 2D shows the tablet computer 10 in "desktop mode," wherein both the video-in link 36 and the data link 38 are established between the tablet computer 10 and the external processor 18 and computer 12. The display 32 is coupled to the external processor 18 via the video-in link 36 to receive a video signal therefrom. As shown, in various embodiments, the tablet computer 10 includes a data flow control device 34, such as a USB hub, in order to control various data flows used in or for the tablet computer 10. In the illustrated embodiment, the positional input signal from the sensor 30 is sent via data flow control device 34 on the data link 38 to the external processor 18. Other data may also be exchanged between the tablet processor 28 and the external processor 18 on the data link 38.

Referring back to FIG. 2B, monitor mode of operating the tablet computer 10 is advantageous in that a user may selectively disable the position input sensor 30, to thereby use the tablet computer 10 as a monitor for the external processor 18/computer 12.

There are at least two advantages associated with the functionality to disable the position input sensor 30. First, it prevents a user, who is viewing the display displaying a video signal from the external processor 18/computer 12, from attempting to operate the sensor 30 that is decoupled from what is shown on the display. This can prevent, for example, a situation in which the user operates the sensor 30 to try to move a folder from one location to another on the external computer's desktop, but instead inadvertently provides input to the internal computer's desktop (not shown on the display) creating random results (including file deletions or corruptions) on the internal computer's desktop. Second, the functionality is advantageous to save battery power of the tablet computer because a tablet computer may continue to operate on battery power even after it is coupled to an external processor. In accordance with further aspects of the present invention, switching to and from monitor mode may be done intuitively, either automatically (without user selection of any switch) or semi-automatically (with user selection of a UI software switch), as will be more fully described below.

FIG. 3A is a block diagram illustrating an example configuration of the tablet computer 10 coupled to an external processor 18. The tablet computer 10 is configured to be operable to switch into and out of monitor mode of operation automatically (without user selection of any switch). Briefly, the automatic switching is done by the tablet processor controller detecting the tablet computer's video-in link status and data link status relative to the external processor 18 and entering into monitor mode if the video-in link exists but the data link does not exist. In monitor mode, the tablet computer 10 displays a video signal from the external processor 18 on the display 32, without communicating the positional input signal from the sensor 30 to either the tablet processor 28 or the external processor 18, thereby essentially disabling the sensor 30.

FIG. 3A shows that the tablet computer 10 includes the positional input sensor 30 (e.g., a pen sensor, a touch sensor, or a combination thereof), the display 32 laid over the sensor 30, and the tablet processor 28 coupled to a memory 44 storing programs for running a tablet OS and executing software loaded to the memory 44. The tablet computer 10 also includes a sensor signal filter 46 in the form of a three-way switch in the illustrated embodiment, and further includes a display switch 48. The sensor signal filter 46 is configured to be capable of selectively communicating the positional input signal from the sensor 30 to a sensor signal interface 47 (e.g., USB interface) of the tablet processor 28, to a sensor signal interface 49 (e.g., USB port) of the external computer 12 containing the external processor 18 (through an interface connector in the data cable 20A, see FIG. 1A), or to neither the tablet processor 28 nor the external processor 18, i.e., to an OFF terminal provided in the three-way switch. As used herein, not communicating the positional input signal to neither of the processors (OFF terminal) refers to a state in which the positional input signal is not used for its intended function. For example, the OFF terminal state includes a situation wherein there is no signal output from the sensor signal filter 46, and a situation where any signal output therefrom is ignored by the controller.

The display switch 48 is configured to be capable of coupling the display 32 to a video signal interface 52 (e.g., HDMI interface) of the tablet processor 28 or to a video signal interface 54 (e.g., HDMI port) of the external processor 18 (through an interface connector in the video cable 20B, see FIG. 1A). As in the illustrated embodiment, the tablet computer 10 may employ standard interface connectors to connect to standard interface ports, such as the USB port 49 and the HDMI port 54 typically provided for a standard processor, which permits coupling of the tablet computer 10 to any generic external computer 12 containing processor 18.

A controller 50 of the tablet processor 28 controls the sensor signal filter 46 and the display switch 48 based on a detected video-in link status relative to the external processor 18 and based on a detected data link status relative to the external processor 18. In the illustrated embodiment, the tablet computer 10 includes a video signal sensor 40 and a data signal sensor 42, which are respectively configured and arranged to detect the video-in link status and the data link status of the tablet computer 10 relative to the external processor 18 and to send detection signals to the controller 50. In FIG. 3A, detection signals that the controller 50 receives, as well as control signals that the controller 50 issues to control the sensor signal filter 46 and the display switch 48, are shown in dashed-line arrows.

The video signal sensor 40 is arranged between the display switch 48 and the external processor 18. When it detects an incoming video signal from the external processor 18, for example, it sends a video-in link status signal to the controller 50 to indicate that the video-in link with the external processor 18 exists. The data signal sensor 42 is arranged between the signal sensor filter 46 and the external processor 18. When it detects no data signal from the external processor 18, for example, it sends a data link status signal to the controller 50 to indicate that the data link with the external processor 18 does not exist. The controller 50, upon detecting a video-in link status change (that the video-in link exists) and using the detected video-in link status change as a trigger, when the data link does not exist with the external processor 18, issues a sensor switch control signal to the sensor signal filter 46 to select the OFF terminal so that the positional input signal from the sensor 30 is not communicated to either the tablet processor 28 or the external processor 18. Also using the detected video-in link status change as a trigger, at the same time, the controller 50 issues a display switch control signal to the display switch 48 to select or confirm that the display 32 is coupled to the external processor 18. For example, if the tablet computer 10 was previously in tethered mode (see FIG. 2C), the display switch 48 needs to switch the connection to couple the display 32, previously connected to the tablet processor 28, to the external processor 18. If the tablet computer 10 was previously in desktop mode (see FIG. 2D), the display switch 48 maintains the connection to continue coupling the display 32 to the external processor 18.

Thus, for example, when the user has the tablet computer 10 in desktop mode with both the data (e.g., USB) cable 20A and the video (e.g., HDMI) cable 20B connected to the external processor 18, and the user disconnects only the data cable 20A, the controller 50 detects that the video-in link exists but the data link does not exist and issues corresponding switch control signals. Accordingly, the tablet computer 10 automatically transitions from desktop mode to monitor mode.

As another example, when the user has the tablet computer 10 in monitor mode, with only the video cable 20B connected to the external processor 18, and the user additionally connects the data cable 20A to the external processor 18, the controller 50 detects that both the video-in link and the data link exist and issues corresponding switch control signals. Accordingly, the tablet computer 10 automatically transitions from monitor mode to desktop mode.

Other transitions to and from monitor mode, as well as further transitions amongst different modes of operation of the tablet computer 10, are also automatically implemented by the controller 50 using the detected video-in link status change as a trigger and based on a status of the data link with the external processor 18.

In some embodiments, a state in which the positional input signal is not output or communicated includes a configuration in which a device driver for the sensor 30 is disabled. In these cases, by disabling the processing in the device driver, no sensor pointer is displayed on the display, thereby preventing a user from attempting to operate the sensor 30.

In some embodiments, in monitor mode when the controller 50 controls the sensor signal filter 46 to not communicate the positional input signal from the sensor 30 to either the tablet processor 28 or the external processor 18, the controller 50 may additionally issue a control signal to disable (deactivate) the sensor 30 so that the sensor 30 does not generate the positional input signal. This arrangement is advantageous in achieving further battery power saving, for example.

As shown in FIG. 3A, the tablet computer 10 may still further include a speaker 56 operable to receive and play an audio signal. When the video signal from the external processor 18 or from the tablet processor 28 is a multimedia signal including both video and audio signals, such as an HDMI signal, the display switch 48 serves to couple both the display 32 and the speaker 56 to either the external processor 18 to receive video and audio signals therefrom, or the tablet processor 28 to receive video and audio signals therefrom.

In other embodiments, where a translator configured to convert the HDMI signal including video and audio to a different video type such as LVDS is configured with the video signal sensor 40, the translator may separate audio from video, and input the audio directly or via a decoder to the speaker 56, while inputting the separate video only to the switch 48.

The tablet computer 10 may still further include a data flow control device 34, such as a data aggregating hub, arranged between the sensor 30 and the sensor signal filter 46 (e.g., the three-way switch). When the data flow control device 34 is provided, and various devices of the tablet computer 10 as well as the sensor 30 are coupled thereto, the sensor signal filter 46 may operate to switch the communication states of all of these devices and the sensor 30 at the same time. The other devices may include, for example, other input/output devices such as a USB jack 58, to which other USB-connected devices 60 such as a mouse, a USB drive, etc., may be connected, and other peripheral devices 62 such as a camera and a microphone. The tablet computer 10 may further include other system devices 66, such as memory for the OS and data files 44, a battery charging circuit, a GPS sensor, a Bluetooth® module, that are directly connected to the processor 28, the data of which may be provided to an external computer 12 via a USB-Client interface 64. As shown in FIG. 3A, all of these other devices and the sensor 30 are connected to downstream ports of the data flow control device 34 (e.g., data aggregating hub), which is in turn connected at its upstream port to the sensor signal filter 46. Thus, the controller 50 may control the connection states of the sensor signal filter 46 to communicate all of the signals from the various devices (except the directly connected devices 66) and the sensor 30 to (and with) the tablet processor 28, to (and with) the external processor 18, or to the OFF terminal at the same time. The ability to essentially disable all of these devices and the sensor 30 at the same time, by coupling them all to the OFF terminal, may be advantageous in achieving further power saving during monitor mode.

Figure 3B:
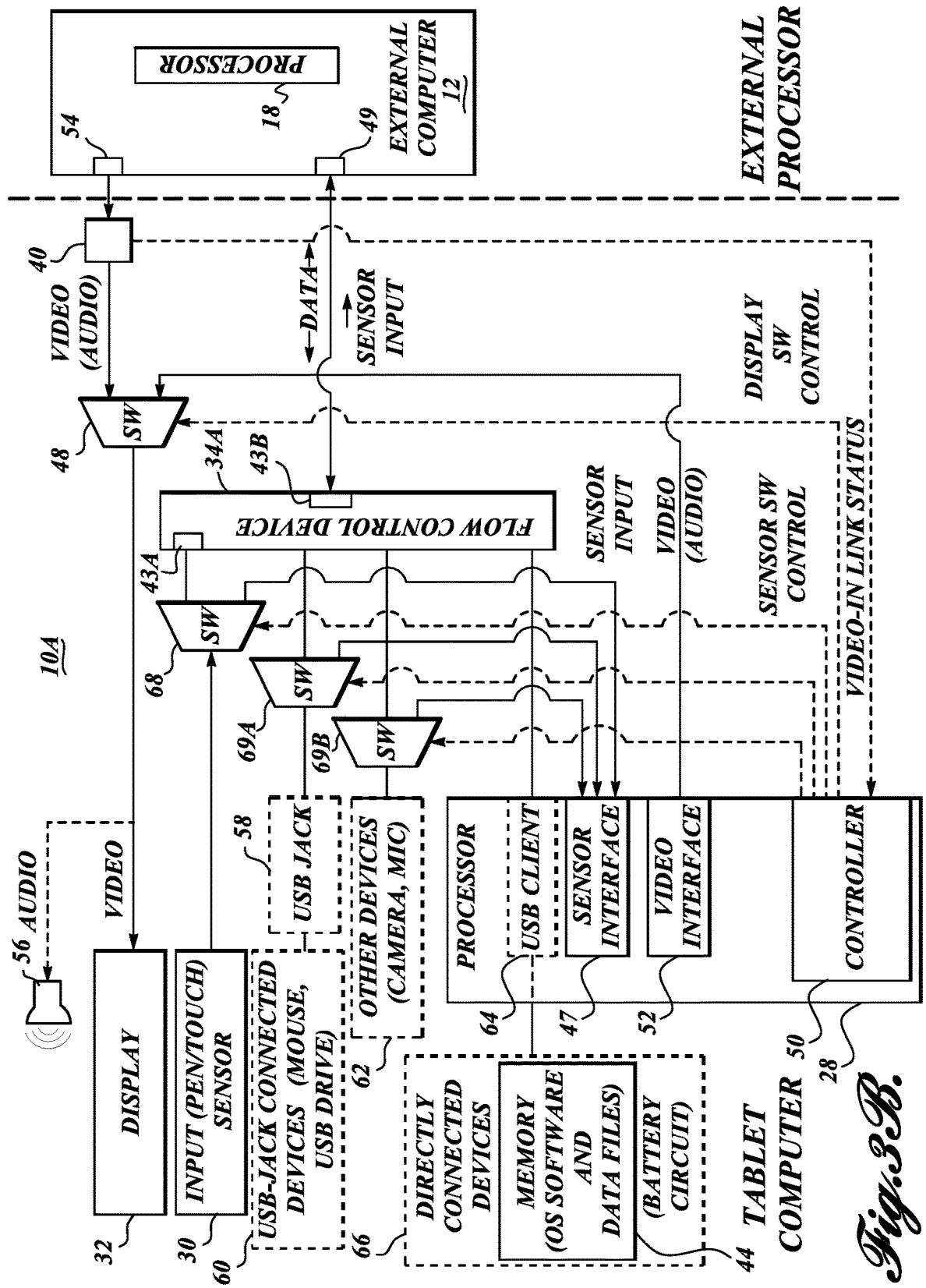

FIG. 3B is a block diagram illustrating another embodiment of a tablet computer 10A coupled to an external processor 18, wherein the like components and elements are labeled and numbered the same as in the previous embodiment shown in FIG. 3A. The embodiment of FIG. 3B differs from that of FIG. 3A in that its sensor signal filter, configured to selectively communicate the positional input signal from the sensor 30 to the tablet processor 28, the external processor 18, or neither the tablet processor 28 nor the external processor 18, is formed of a combination of a two-way switch 68 and a data flow control device 34A, such as a data aggregating and filtering hub (e.g., USB hub). The two-way switch 68 is configured and arranged to selectively communicate the positional input signal from the sensor 30 to the sensor signal interface 47 (e.g., USB interface) of the tablet processor 28 or to a downstream port 43A of the data flow control device 34A. The data flow control device 34A (e.g., USB hub) is operable to select between communicating or not communicating (filtering) the positional input signal received via the downstream port 43A from the two-way switch 68 to the external processor 18 via an upstream port 43B. For example, the USB hub is operable to turn off its flow control function when detecting no data traffic coming to the upstream port 43B from the external processor 18 (e.g., when the upstream port 49 is found to be disconnected). Thus, the upstream port 43B of the USB hub 34A essentially functions as an internal data signal sensor (see 42 in FIG. 3A) which, when detecting no data traffic from the external processor 18, may determine that the data link with the external processor 18 does not exist.

In operation, when the user has the tablet computer 10A in mobile mode with both the data (e.g., USB) cable 20A and the video (e.g., HDMI) cable 20B disconnected from the external processor 18 (see FIG. 2A), and the user connects only the video cable 20B, the video signal sensor 40 sends to the controller 50 a video-in link status signal indicating that a video-in link with the external processor 18 exists. The controller 50, thus determining that the video-in link exists with the external processor 18, issues a sensor switch control signal to the two-way switch 68 to switch the connection to couple the sensor 30, previously connected to the tablet processor 28, to the downstream port 43A of the data flow control device 34A (which essentially serves as an OFF terminal because the data flow control device 34A has turned off its flow control function). At the same time, the controller 50 issues a display switch control signal to the display switch 48 to switch the connection to couple the display 32, previously connected to the tablet processor 28, to the external processor 18. Thus, the tablet computer 10A transitions from mobile mode to monitor mode automatically based on detected statuses of the video-in link and the data link with the external processor 18.

As another operational example, when the tablet computer 10A is in monitor mode with only the video cable 20B connected to the external processor 18, and the user disconnects the video cable 20B from the external processor 18, the tablet computer 10A automatically transitions from monitor mode back to mobile mode. Specifically, the video signal sensor 40 sends to the controller 50 a video-in link status signal indicating that a video-in link with the external processor 18 does not exist. The controller 50, thus determining that the video-in link with the external processor 18 does not exist any longer, issues a sensor switch control signal to the two-way switch 68 to switch the connection to couple the sensor 30, previously connected to the downstream port 43A of the data flow control device 34A, to the tablet processor 28. At the same time, the controller 50 issues a display switch control signal to the display switch 48 to switch the connection to couple the display 32, previously connected to the external processor 18, to the tablet processor 28.

Thus, the tablet computer 10A of the embodiment of FIG. 3B is also capable of automatically transitioning into and out of monitor mode based on detected statuses of the video-in link and the data link with the external processor 18. Other transitions amongst various modes of operation, shown in FIGS. 2A-2D, are also automatically implemented by the controller 50 based on detected statuses of the video-in link and the data link with the external processor 18.

As with the previous embodiment of FIG. 3A, in the embodiment of FIG. 3B, various other devices 58, 60, 62, and the USB client interface 64 may be coupled to downstream ports of the data flow control device 34A to have their data lines aggregated therein. Unlike the previous embodiment, however, because the two-way switch 68 is arranged between the sensor 30 and the downstream port 43A of the data flow control device 34A to thereby control the connection state of only the sensor 30, the sensor signal filter comprised of the two-way switch 68 and the data flow control device 34A does not function to switch the connection states of all of these devices and the sensor 30 at the same time. As illustrated in FIG. 3B, a switch 69A is provided between the USB jack 58 and a downstream port of the data flow control device 34A, and a switch 69B is provided between the other input/output devices 62 and a downstream port of the data flow control device 34A. The controller 50 is operable to issue sensor switch control signals to the switches 69A and 69B based on the detected statuses of the video-in link and the data link with the external processor 18, to selectively change the operation mode (e.g., disabled or abled) of the USB jack 58 and the other input/out devices 62, respectively.

FIG. 3C illustrates a configuration including the flow control device 34, which allows for switching among three operation modes of the sensor based on a reported video-in link status change, without requiring a report of a data link status change. The flow control device 34 is a device capable of shutting off a communication flow from its downstream port to its upstream port when the uplink port 43B is in disconnected state, independently and regardless of any control signal from the controller 50. In the illustrated embodiment, two types of sensors 30A and 30B are connected as the sensor 30, to which switches 68A and 68B are respectively connected. In this example, the controller 50 performs the following operation: (i) it receives a video-in link status change report (connected or disconnected) from the video signal detector 40, which has detected whether the video-in link exists or not; (ii) it switches the switch 48 from IN to EXT (or from EXT to IN), in order to have the video signal from the external on the display 32; (iii) without waiting for a report of a data link status and using only the detected video-in link status change as a trigger, it switches the switches 68A and 68B for the sensor 30 from IN to EXT (or from EXT to IN), similar to the display 32.

When the uplink port 43B of the flow control device 34 is in connected state, and when the switches 68A and 68B are switched to EXT, the sensor 30A/30B can output the positional input signal to the external processor 18. When the uplink port 43B of the flow control device 43 is in disconnected state, because the switches 68A and 68B are both in EXT state, the positional input signal form the sensor is not output to either of the processors, i.e., the sensor is disabled.

As shown in FIG. 3C, by using the flow control device 34 capable of shutting off its traffic flow based on the uplink port status, independently of the controller 50, it is possible to achieve switching between three operation modes of the sensor 30 (30A, 30B) using a 1-to-2 switch: EXT, where the positional input signal is communicated to the external processor 18; IN, where the positional input signal is communicated to the internal processor 28; and DISABLE, where the sensor is unused). Also, switching among the three operation modes is achieved based only on a detected video-in link status change, without requiring reporting of a data link status, which facilitates implementation with a simpler configuration. Still further, the controller 50, when receiving a report from the video signal sensor 40 that a video-in link is disconnected, switches the switches 68A, 68B from EXT to IN, without having to wait for reporting of a data link status. Therefore, even when the uplink port 43 of the flow control device 34 is connected to the external processor 18, without any explicit control from the controller 50, based on the connection from the directly connected devices 66 of the internal processor 28 to the sensor signal interface 49 of the external computer 12 via the flow control device 34, the connectivity to the directly connected devices 66 such as the storage (or a GPS sensor, Bluetooth® module, etc.) via the USB client component 64 can be ensured.

In other embodiments, the video signal sensor 40 is capable of detecting whether an external computer is connected, and whether that external computer is sending a video signal or not (the latter, e.g., because the external computer went to sleep). In such an embodiment, the controller 50 may switch the switch 46 (see FIG. 3A) to connect the sensor 30 and other devices to the external computer 12 if the video connection is established and a video signal is provided, or switch the switch 46 to OFF if the video connection is established but no video data is provided by the external computer 12, or switch the switch 46 to connect the sensor 30 and other devices to the internal processor 28 if no video connection is established.

FIG. 4 is a block diagram illustrating further embodiments of a tablet computer 10B coupled to an external processor 18, wherein the like components and elements are labeled and numbered the same as in the previous embodiments of FIGS. 3A and 3B. The embodiments of FIG. 4 differ from the previous embodiments in that they are specifically configured to be coupled to an external processor 18 via a single cable connection 20C (e.g., Thunderbolt® cable) or a wireless connection 20D (e.g., Bluetooth®, a USB protocol data encapsulated in frame IEEE 802.11a/b/g/n, WiHD™ or similar technology), as shown in FIG. 1B. Also, the external processor 18, to which the tablet computer 10B is coupled, is part of an external computer 12 including at least an input device 16 (e.g. keyboard, trackpad or mouse), such as the laptop computer 12A of FIG. 1B.

In this embodiment, when the tablet computer 10B is coupled to the external processor 18 via the single cable connection 20C or the wireless connection 20D, through which all of the lines (e.g., the data line, the video line, a command line, etc.) are connected or disconnected at the same time, a user is given the ability to selectively connect or disconnect one or more of these lines to effect operation mode switching for the tablet computer 10.

An embodiment of the tablet computer 10B using a single cable connection is first described. The tablet computer 10B includes multiple switches 70A, 70B, 70C, 70D . . . , respectively assigned to multiple devices of the tablet computer 10B. In the illustrated embodiment, the positional input sensor 30 includes a pen sensor 30A and a touch sensor 30B, which are operable to detect positional input by a pen and a finger to output a pen input signal and a touch input signal, respectively. The first switch 70A is connected to the pen sensor 30A and the second switch 70B is connected to the touch sensor 30B. The tablet computer 10B may also include further devices, such as a memory/data storage device 44 or battery charging circuit or Bluetooth antenna, etc., directly connected to the processor 28, the data of which the processor 28 may provide to the external computer 12 via the USB client module 64. Additional switches 70C and 70D may be provided for additional devices of the tablet computer 10B, such as the USB jack 58 and the other input/output devices 62, respectively, in a similar manner as shown and explained for FIG. 3B.

Each of these switches 70A, 70B, 70C and 70D is provided to selectively establish (or not establish) a data link between the corresponding device (the pen sensor 30A, the touch sensor 30B, the USB-connected devices 60, and the other input/output devices 62 of the tablet computer 10B) and the external processor 18 while the tablet computer 10B is coupled to the external processor 18 via the single cable 20. For example, the first and second switches 70A and 70B may be each comprised of a three-way switch operable to selectively communicate the positional input signal received from the corresponding sensor 30A or 30B to a sensor signal interface 72A or 72B (e.g., USB interface) of the external processor 18, the sensor signal interface 47 (e.g., USB interface) of the tablet processor 28, or an OFF terminal (i.e., to neither the external processor 18 nor the tablet processor 28). The third and fourth switch 70C and 70D do the equivalent switching for, e.g., the other I/O devices 62 or USB-connected devices 60, with respect to the interfaces 72C and 72D of the external computer 12. Operation states of each of these switches 70A, 70B, 70C and 70D are controlled by data switch control signals issued from the tablet processor controller 50.

As in the previous embodiments, the tablet computer 10B also includes the display switch 48 capable of coupling the display 32 of the tablet computer 10B to either the external processor 18 or the tablet processor 28 based on a display switch control signal issued from the controller 50.

According to some embodiments, a user may semi-automatically control operation of each of the various devices of the tablet sensor 10B coupled to each switch via a user interface (UI) window displayed on display 32 of the tablet computer 10 using the input device 16 of the external computer 12. FIG. 4 illustrates the display 32 showing a UI window 78 including various user-selectable elements (checkboxes, buttons, or other user-selectable software switches). The user-selectable elements are provided to permit user control of each of the switches 70A, 70B, 70C, and 70D, i.e., to control the connection state of each switch to establish a data link between the corresponding device and the external processor 18, or to establish a data link between the corresponding device and the tablet processor 28, or not to establish a data link with either of the processors 18 and 28 (i.e., "OFF" state).

In the illustrated embodiment, when the single cable 20 is coupled to the external processor 18, all of a video-in link 79 and various data links 81A, 81B, 81C, 81D, and 81E are established. The data links 81A, 81B, 81C, 81D, and 81E are respectively between the pen sensor 30A (via the switch 70A) and the interface 72A, between the touch sensor 30B (via the switch 70B) and the interface 72B, between the USB jack 58 (via the switch 70C) and the interface 72C, between the other input/output device 62 (via the switch 70D) and the interface 72D, and between the USB client 64 and a USB interface 74. Also, the controller 50 establishes a command link 83 with the external processor 18. For example, the controller 50 may establish an Android® Debug Bridge (ADB) link as a command link through the USB-Client interface connection 64 to the processor interface 74, through which the controller 50 may send a message to and receive a message from the external processor 18. In accordance with some embodiments of the present invention, the controller 50 sends a mode-switching UI message to the external processor 18. The external processor 18 may then send a video signal to display the UI window 78 on the display 32 of the tablet computer 10 based on the received mode-switching UI message, according to any standard message passing system or protocol such as MPI. When a user makes entry in the UI window 78 using the input device 16 of the external computer 12 (or using the input sensor 30 of the tablet computer 10B, if not disabled), the external processor 18 recognizes the user entry and sends a UI-entry message indicative of the user entry to the tablet controller 50. The controller 50 interprets the received UI-entry message to identify user selection of one or more of the user-selectable elements, and issues corresponding data switch control signals to control the connection states of the switches 70A, 70B, 70C, and 70D. For example, when the received UI-entry message indicates user selection of "PEN" "OFF" state, the controller 50 issues a data switch control signal to the switch 70A to switch its connection state to "OFF" state.

In FIG. 4, the UI window 78 includes the user-selectable elements that allow a user to select between two operation modes for the "PEN" sensor 30A and the "TOUCH" sensor 30B. The two operation modes are to establish or maintain a data link with the external processor 18 such that these sensors are available for the external processor 18 ("ON"), or to not establish or maintain a data link with either the external processor 18 or the tablet processor 28 to essentially disable these sensors ("OFF"). With the video-in link 79 maintained, user selection of the "ON" element results in desktop mode of operation and user selection of the "OFF" element results in monitor mode of operation, as previously described.

As apparent from the above examples, the meaning of each of the user-selectable elements may vary depending on each device and each application. Also, there may be one, two, or three operation modes provided for a user based on a two-way switch or a three-way switch associated with a particular device of the tablet computer 10B. By selectively activating various user-selectable elements on the UI window 78, the user may cause the tablet computer 10B to switch between various operation modes. For example, an operation mode in which the user has turned "ON" only the "PEN" sensor 30A and the "OTHER I/O DEVICES" (e.g., "CAMERA & MIC") device 62, as shown in FIG. 4, is different from an operation mode in which the user has turned "ON" only the "TOUCH" sensor 30B. Based on a combination of various user-selectable elements, as well as particular selection states of the user-selectable elements in each application, various operation modes may be realized for the tablet computer 10B. That is, the operation modes of the tablet computer 10B may switch semi-automatically based on user selection of a particular set of the user-selectable elements (UI software switches) on the UI window 78.

As shown in FIG. 4, the UI window 78 may therefore display on the display 32 an indicator of an operation mode selected by the user. For example, the UI window 78 may indicate "PEN" sensor 30A "OFF" corresponding to monitor mode when the video-in link 79 is maintained. As another example, the UI window 78 may indicate "CAMERA & MIC" "ON" to indicate an operation mode in which the external processor 18 may access the tablet computer's other I/O devices 62.

In both monitor mode and desktop mode, the display displays a video signal provided from the external processor and, therefore, a user may not be readily distinguish between the two modes. Then, the command link 83 may be used by the tablet controller 50 to send a message to the external processor 18, to cause the external processor 18 to send "back" a video signal including an operation mode indicator to the tablet display 32 via the video-in link 79. For example, when the video-in link 79 exists but no data link exists, an indicator indicative of monitor mode may be sent to the tablet display 32. This indicator notifies the user that the input sensor 30 is not operable and the tablet computer 10 is functioning as a monitor for the external processor 18.

Thus, the tablet computer 10B of the present embodiment is capable of allowing a user to selectively place any of the devices of the tablet computer 10, such as the pen sensor 30A, the touch sensor 30B, the other I/O devices 62 or the USB-Jack 58 and USB-connected devices 60, in communication with the external processor 18 under control of the external processor's OS, or in communication with neither of the processors (i.e., disabling them).

The embodiment of the tablet computer 10B of FIG. 4 may also be implemented using a wireless connection 20D to couple the tablet computer 10B to the external processor 18. The wireless connection 20D may be, for example, a connection pursuant to Bluetooth®, a USB protocol data encapsulated in frame IEEE 802.11a/b/g/n, WiHD (WirelessHD™) or similar technologies. The tablet computer 10B includes a suitable wireless connection circuit 80 to prepare wireless signals to be transmitted, via an antenna 82, to the external computer 12, which is correspondingly equipped with a suitable wireless connection circuit and an antenna.

FIG. 5A is a flowchart illustrating an example process of switching operation modes of a tablet computer coupled to an external processor, according to one embodiment of the present invention. The method includes generally three steps: (i) detecting a video-in link status of the tablet computer from a separate external processor (block 83); (ii) detecting a data link status of the tablet computer relative to the separate external processor (block 84); and (iii) when the video-in link exists but the data link does not exist relative to the separate external processor, displaying a video signal from the separate external processor on a tablet display and not communicating the positional input signal from a tablet sensor to either the tablet computer processor or the separate external processor (block 85).

FIG. 5B is a flowchart illustrating another example process of switching operation modes of a tablet computer coupled to an external processor, according to another embodiment of the present invention. The process includes generally two steps:

STEP I—detecting a video-in link status of the tablet computer from a separate external processor (block 83A), and STEP II—using a change in the detected video-in link status as a trigger, and based on a data link status, switching between three operation modes of the sensor including (EXTERNAL), wherein the positional input signal is communicated to the external computer; (INTERNAL), wherein the positional input signal is communicated to the internal processor; and (DISABLE), wherein the sensor is unused (block 84A).

Figure 5C:
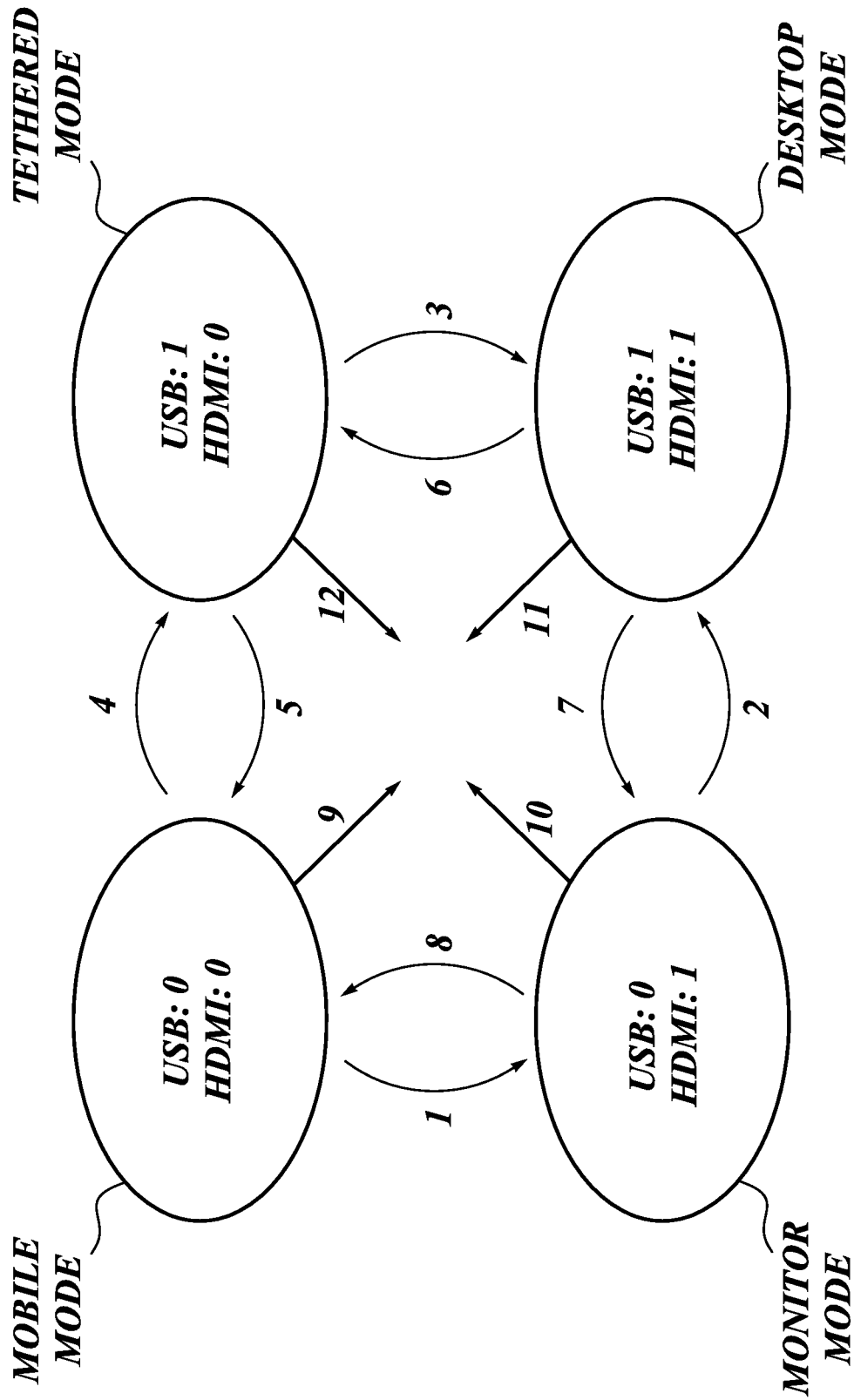
FIGS. 5C and 5D are diagrams illustrating transitions among four operational modes and three operational modes, respectively, of a tablet sensor according to various embodiments.

FIG. 5C is a diagram illustrating twelve transitions amongst four operation modes of a sensor. In FIG. 5C, the number following "USB" indicates the data link interface status. "1" indicates a data link with the external processor 18 and "0" indicate no data link. Also, the number following "HDMI" indicates the video-in link interface status. "1" indicates a video-in link with the external processor 18 and "0" indicates no video-in link. In FIG. 5C, arrow 1 indicates a transition of a video-in link status from disconnected to connected while a data link is disconnected. Arrow 2 indicates a transition of a data link status from disconnected to connected while a video-in link is connected. Arrow 3 indicates a transition of a video-in link status from connected to disconnected while a data link is connected. Arrow 4 indicates a transition of a data link status from connected to disconnected while a video-in link is disconnected. Arrow 5 indicates a transition of a data link from disconnected to connected while a video-in link is disconnected. Arrow 6 indicates a transition of a video-in link status from disconnected to connected while a data link is connected. Arrow 7 indicates a transition of a data link from connected to disconnected while a video-in link is connected. Arrow 8 indicates a transition of a video-in link from connected to disconnected while a data link is disconnected. Arrows 9-12 respectively indicate combinations of two of the transitions 1-8 at the same time, wherein the statuses of both interfaces (USB and HDMI) are changed.

Figure 5D:
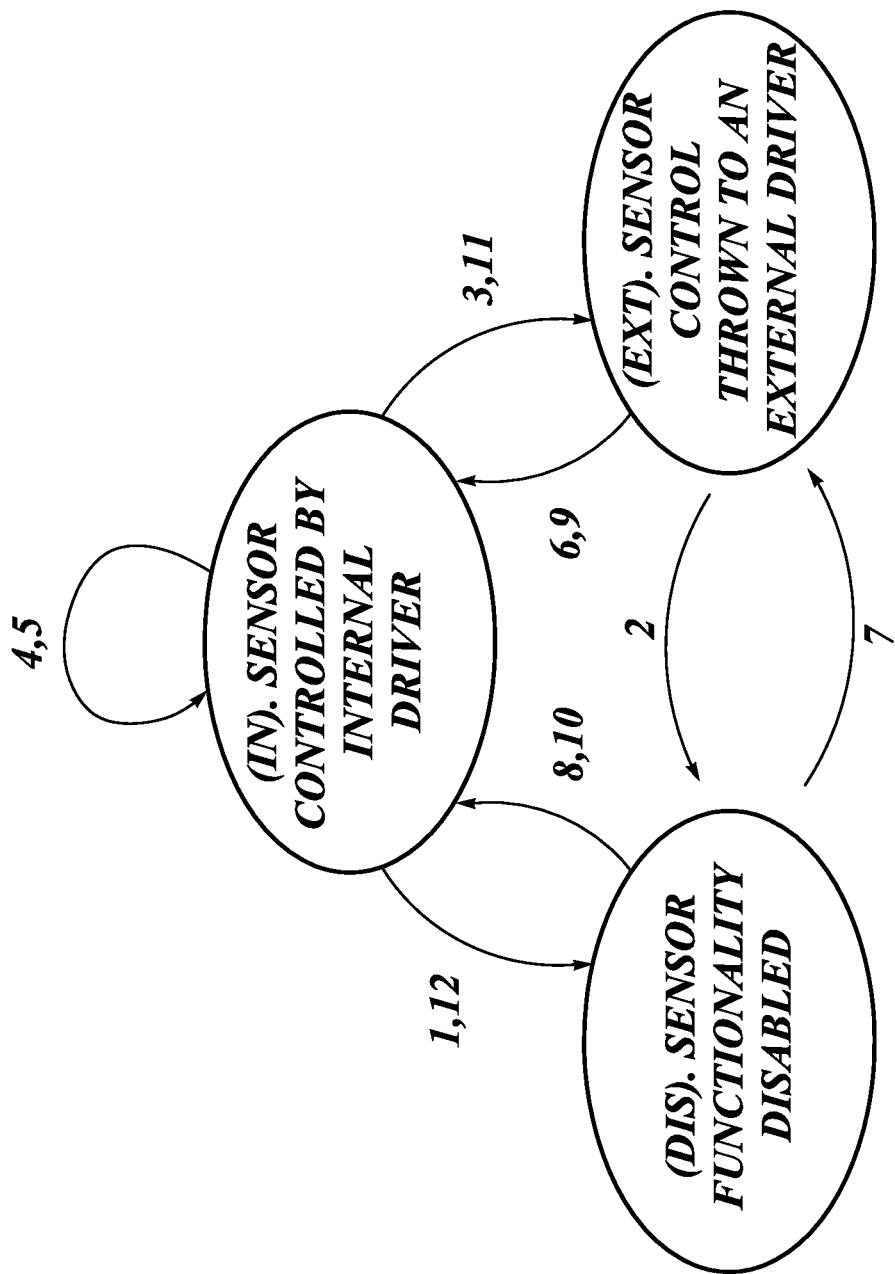

FIG. 5D indicates various transitions to switch amongst three operation modes of a sensor, which may be implemented by the controller 50 in STEP I (block 83A) of FIG. 5B. In FIG. 5D, the number(s) placed adjacent to each transition arrow indicates input for each transition, and the number corresponds to the transitions 1-12 detailed above in reference to FIG. 5C. If transition (status change) 1 is provided as input to the computer 10, which is a transition of a video-in link status from disconnected to connected while a data link is disconnected, the controller 50 executes control so as to render the sensor 30 in an unusable state (DISABLE). Such control may entail disabling a device driver of the sensor 30 as described above, or may entail use of the flow control device 34 as shown in FIG. 3C to independently cut off the flow of the positional input signal from the sensor 30. When transition (status change) 8 is detected, the controller 50 transitions the sensor 30 from the unusable state (DISABLE) to a state at which the sensor 30 is controlled by the internal processor 28 (INTERNAL), i.e., into mobile mode.

If transition (status change) 2 is detected as input, wherein a data link status is transitioned from disconnected to connected while a video-in link is connected, the tablet computer 10 switches the operation modes of the sensor 30 from DISABLE to EXTERNAL. In transition (status change) 7, wherein a data link status is transitioned from connected to disconnected while a video-in link is connected, the tablet computer 10 switches the operation modes of the sensor 30 from EXTERNAL to DISABLE. These switching operations may be executed by the controller 50.

While transitions 1 and 8 require control by the controller 50, transitions 2 and 7 may be realized based on the independent operation of the flow control device 34 described above in reference to FIG. 3C without requiring control from the controller 50.

Thus, a video-in link status signal, which has been used to trigger switching of operation modes of the display 32, is used also as a trigger to switch operation modes of the sensor 30, according to various embodiments of the present invention. Further, because the sensor 30 is disabled in correspondence to what is displayed on the display 32, an undesirable situation can be avoided, such as that a user attempts to operate the sensor 30 coupled to the internal processor 28 while viewing the display 32 displaying a video signal from the external computer 12.

In each of the transitions as shown in FIG. 5D (or 5C), a defined process specific to each transition can be carried out by the controller. For example, in transition (status change) 7 of switching from desktop mode to monitor mode, after detecting a video-in link status (STEP I of FIG. 5B) and before switching the operation mode based on the detected video-in link status as a trigger (STEP II of FIG. 5B), a suitable command may be issued to display a UI indication on the display to assist a user to distinguish between monitor mode and desktop mode. As another example, in transition (status change) 9 of switching from mobile mode to desktop mode, internal unnecessary processes, such as the process concerning a device driver for the sensor and a Wireless LAN related process, may be disabled so as to decrease battery/power consumption. As a further example, also in transition 9 of switching from mobile mode to desktop mode, after the transition is completed, the latest file edited by the application on the internal processor may be uploaded to be editable by the external processor.

FIG. 6 is a flowchart illustrating another example process of switching operation modes of a tablet computer coupled to an external processor, suitable for execution in a tablet computer coupled to an external processor wirelessly or via a single cable such as the tablet computer 10B described above in FIG. 4. The process includes generally six steps: (i) establishing a video-in link between the tablet computer (the tablet display) and a separate external processor (block 86); (ii) establishing a data link between at least one of the sensor section 30 and the one or more devices (e.g., 60,62) of the tablet computer and the external processor (block 87); (iii) establishing a command link with the separate external processor (block 88); (iii) sending a mode-switching user interface (UI) message to the separate external processor via the command link to cause the separate external processor to display a mode-switching UI on the tablet display, the mode-switching UI including at least one user-selectable element to control operation of at least one of the sensor section and the one or more devices of the tablet computer (block 89); (iv) receiving user selection of the at least one user-selectable element on the tablet display, made via an external input device coupled to the separate external processor (or via the sensor section, if not disabled), as a UI-entry message from the external processor via the command link (block 90); and (v) controlling operation of the corresponding device based on the received UI-entry message (block 91).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A mobile tablet computer, comprising:
   a sensor section operable to detect positional input by a human operator and output a positional data to an interface;
   a display, arranged so that the sensor section and the display form a stack, operable to receive, through a display interface, a video signal and display the video signal; and
   an internal processor, coupled to a memory storing programs for running an operating system (OS) and executing software loaded to the memory, the internal processor being operable to:
   (i) responsive to a detected first link status indicating the interface is connected to an external computer, control the mobile tablet computer, as a human interface device of the external computer, to input the positional data via the interface to the external computer; and
   (ii) responsive to a detected second link status indicating the interface is not connected to the external computer, control the mobile tablet computer, as a host computer, based on the position data.

2. The mobile tablet computer of claim 1, wherein the internal processor is operable to receive and process the position data from the sensor section and to output the video signal of the OS and the software to the display.

3. The mobile tablet computer of claim 1, wherein the interface is a universal serial bus (USB) interface.

4. The mobile tablet computer of claim 1, comprising:
   one or more switches, operable to:
   connect the interface and the display interface to the external computer in a human interface device mode; and
   connect the interface and the display interface to the internal processor in a host computer mode.

5. The mobile tablet computer of claim 4, wherein, the one or more switches, in the human interface device mode, do not supply the positional data to the internal processor.

6. The mobile tablet computer of claim 4, wherein switching between the human interface device mode and the host computer mode is based at least on a video-in link status of the mobile tablet computer relative to the external computer.

7. The mobile tablet computer of claim 6, wherein the video-in link status is a logical state of the video interface capable of communicating the video signal from the external computer to the display.

8. The mobile tablet computer of claim 4, wherein switching between the human interface device mode and the host computer mode is based at least on a logical state of the interface.

9. The mobile tablet computer of claim 4, wherein,
   in the human interface device mode, the display displays the video signal from the external computer, and in the host computer mode, the display displays the video signal of the OS and the software.

10. The mobile tablet computer of claim 9, wherein, in the host computer mode, the display displays the video signal of the OS and the software in which a cursor is placed at a position of the positional data.

11. The mobile tablet computer of claim 1, comprising:
one or more switches, operable to:
connect the interface to the external computer in a human interface device mode; and
connect the interface to the internal processor in a host computer mode.

12. The mobile tablet computer of claim 11, wherein the display is disabled in the human interface device mode.

13. The mobile tablet computer of claim 11, wherein, the one or more switches, in the human interface device mode, do not supply the positional data to the internal processor.

14. The mobile tablet computer of claim 11, wherein switching between the human interface device mode and the host computer mode is based at least on a video-in link status of the mobile tablet computer relative to the external computer.

15. The mobile tablet computer of claim 14, wherein the video-in link status is a logical state of the video interface capable of communicating the video signal from the external computer to the display.

16. The mobile tablet computer of claim 11, wherein switching between the human interface device mode and the host computer mode is based at least on a logical state of the interface.

17. The mobile tablet computer of claim 11, wherein, in the host computer mode, the display displays the video signal of the OS and the software in which a cursor is placed at a position of the positional data.

\* \* \* \* \*